United States Patent [19]

Lynch et al.

[11] Patent Number: 4,739,600
[45] Date of Patent: Apr. 26, 1988

[54] NON-SLIP MITER BUTT JOINT

[75] Inventors: Ronald J. Lynch, Monroeville; Robert Yee, Wilkinsburg, both of Pa.

[73] Assignee: Chelsea Industries, Inc., Brighton, Mass.

[21] Appl. No.: 27,794

[22] Filed: Mar. 19, 1987

Related U.S. Application Data

[63] Continuation of Ser. No. 781,531, Sep. 30, 1985, abandoned.

[51] Int. Cl.$^4$ .............................................. E06B 1/00
[52] U.S. Cl. ............................................ 52/656; 52/726; 49/161; 49/504; 403/402; 403/382
[58] Field of Search ........................... 52/656, 657, 475; 49/161, 181, 408, 388, 504; 403/402, 382, 403, 726

[56] References Cited

U.S. PATENT DOCUMENTS

| | | | |
|---|---|---|---|
| 2,155,729 | 4/1939 | Mainieri | 403/382 |
| 2,874,420 | 2/1959 | Henderson | 403/382 |
| 3,835,616 | 9/1974 | Van Wieringen | 403/402 |
| 3,924,956 | 12/1975 | Fortier | 403/382 |
| 3,952,473 | 4/1976 | Jesse | 52/476 |
| 4,042,004 | 8/1977 | Kwan | 49/408 |
| 4,630,386 | 12/1986 | Wilson | 403/403 |
| 4,640,048 | 2/1987 | Winner et al. | 403/402 |

FOREIGN PATENT DOCUMENTS

| | | | |
|---|---|---|---|
| 2238446 | 2/1974 | Fed. Rep. of Germany | 52/475 |
| 3112329 | 10/1982 | Fed. Rep. of Germany | 49/388 |
| 1534958 | 8/1968 | France | 49/161 |
| 2461884 | 3/1981 | France | 52/475 |
| 648459 | 11/1962 | Italy | 403/402 |
| 6609644 | 1/1967 | Netherlands | 52/656 |
| 7808102 | 2/1980 | Netherlands | 52/656 |
| 37228 | 6/1923 | Norway | 52/475 |
| 8302973 | 9/1983 | PCT Int'l Appl. | 52/656 |

OTHER PUBLICATIONS

The Carpenter and Joiner's Assistant Newlands, 1860.

*Primary Examiner*—John E. Murtaugh
*Assistant Examiner*—Caroline D. Dennison
*Attorney, Agent, or Firm*—Wolf, Greenfield & Sacks

[57] ABSTRACT

In a window frame assembly having hollow frame members, a joint interconnecting the ends of two adjacent frame members is described. The joint includes a rabbeted miter cut and an anti rack and twist component. These features act synergistically to align and firmly joint adjacent frame members.

14 Claims, 6 Drawing Sheets

NON-SLIP MITER BUTT JOINT

RELATED APPLICATIONS

This application is a continuation of application Ser. No. 06/781,531 filed Sept. 30, 1985, now abandoned.

This invention relates in general to window frame assemblies and more particularly to improvements in the joint interconnecting the adjacent sides of a window frame, and related improvements in the window-receiving channel of a window frame.

BACKGROUND OF THE INVENTION

The use of a miter cut to join two pieces of wood has been well-known for centuries. A miter cut may be linear or non-linear. It is also known to use a combination of a linear and non-linear cut to form a miter joint. Such a joint is identified in *Webster's New Collegiate Dictionary*, G. and C. Merriam Company, Springfield, Mass. 1981, at page 731, as a rabbeted miter joint. Such a joint, however, has not been used in hollow window frame constructions for multi-component corner joints.

U.S. Pat. No. 2,701,397 (Perkins) shows a construction for a storm window frame which includes a diagonal cut at the inside corner of the joint, which cut forms only a portion of the joint. However, the rest of the joint does not meet face-to-face, but rather overlaps.

U.S. Pat. No. 2,874,420 shows a metal door frame. Again, there is a diagonal cut from the inside corner of the joint, which cut forms the major portion of the joint. The remaining portion of the joint is a curved cut ending along the outside face of a lateral surface of the door frame, not at the apex of the outside corner. This joint is designed for a door frame with the corner construction configured to allow the frame members to swing from an acute angle to a right angle position and to maintain the right angle by a snap together joint.

It is an object of the invention to provide a window frame having strong joints.

Another object of the invention is to provide a window frame having joints that fit together easily in precise relationship.

Another object of the invention is to provide a window frame having joints that are easily assembled without lateral or diagonal misalignment to assure a square sash assembly.

Another object of the invention is to provide a window frame having joints that will not rack and twist.

Another object of the invention is to provide a window frame having joints that can be tightly sealed.

Another object of the invention is to provide a window frame that is capable of providing a leakproof seal between the frame and the window it captures.

Another object of the invention is to provide a window frame having the capacity to channel moisture away from damaging contact with the sealing components to prevent sealant failure.

It is still another object of the invention to provide a window frame having an increased capacity for insulation.

SUMMARY OF THE INVENTION

According to the invention, a window frame assembly having hollow frame members is provided. The ends of two adjacent frame members meet to form a corner having an apex and an elbow. The joint interconnecting the ends is a miter cut line extending in a first portion linearly from the apex to a first point between the apex and the elbow and then extending in a second portion non-linearly from the first point to the elbow. The second portion preferably has a right angle between the first point and the elbow. This construction forms a joint that easily fits together in precise relationship to insure that there is no diagonal misalignment and in particular to insure that the outer edges of the frame members meet precisely at the apex.

Also according to the invention, the joint includes an anti rack and twist component. Preferably this is a tongue member on one of the ends of the adjacent frame members and a groove member on the other of the ends. This feature acts synergistically with the miter cut line to properly align the two ends. It also acts synergistically with the miter cut line to prevent racking and twisting. Additionally, it increases the strength of the joint.

A frame member has a glazing channel defined by an inner wall, outer wall and a channel base wall joining the inner and outer walls. The inner and outer walls are, in at least a portion, double-walled with a hollow core. The double wall affords an improved surface for sealing the joint and increases the insulative capacity of the window frame. The channel base wall has a moisture trough for channeling moisture away from damaging contact with the sealing components to prevent sealant failure. The moisture trough has an elongated rib to support a window edge.

In an alternate embodiment of the invention, a frame member for a window frame assembly is provided. The frame member has an inner face, an outer face and two ends, with the outer face meeting one of the ends at an outer edge and the inner face meeting the same end at an inner edge. A miter cut extends in a first portion from the outer edge to a first point between the outer edge and the inner edge and then extends in a second portion from the first point to the inner edge at an angle from the first portion. Preferably there is a right angle between the first point and the inner edge. The frame member also is provided with an anti rack and twist component.

DETAILED DESCRIPTION OF THE DRAWINGS

Figure 1:
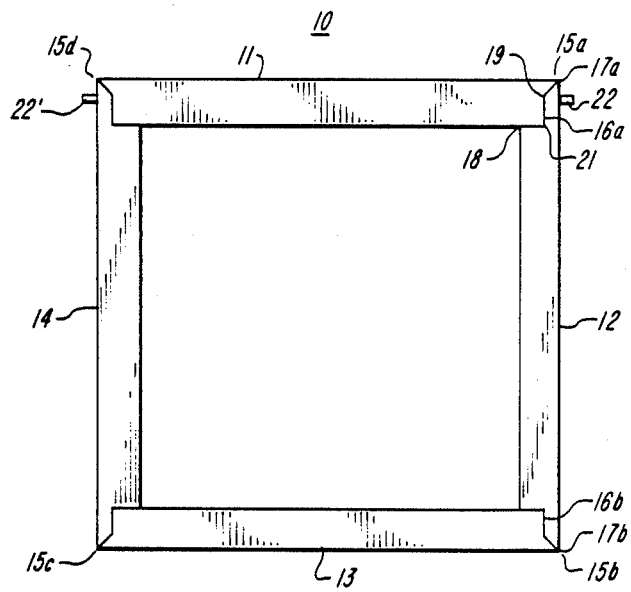
FIG. 1 is a view of a window frame assembly according to the preferred embodiment of the invention.

The frame assembly 10 of the preferred embodiment of this invention is generally shown in FIG. 1. The frame assembly 10 consists of four hollow frame members indicated at 11, 12, 13 and 14. Adjacent frame members are interconnected at their ends by identically constructed joints, generally indicated at 15a, 15b, 15c and 15d. Referring now to joint 15a, first frame member 11 and second frame member 12 meet along miter cut line 16a to form a corner having an apex 17 on the outside of the window frame assembly and an elbow 18 on the inside. The miter cut line 16a extends from the apex 17 to the elbow 18. A first portion of miter cut line 16a extends from the apex 17 at or about a 45 degree angle to a first point 19, ideally less than halfway between the apex 17 and the elbow 18 and ideally not more than one inch from apex 17. A second portion of miter cut line 16a then extends from the first point 19 in substantial alignment with the length of the second frame member 12 to a second point 21, the second point being at a lateral distance from the apex 17 that is equivalent to the width of the first frame member 11. The second portion then continues from the second point 21 in substantial alignment with the length of the first frame member 11 to the elbow 18. The angle formed by the second portion between the first point, the second point and the elbow is a right angle.

The window frame assembly includes two pivot bars, first pivot bar 22 and second pivot bar 22', which are secured within the hollow core of first frame member 11. First pivot bar 22 extends laterally through and beyond the plane of the outermost face of second frame member 12. Second pivot bar 22' extends laterally through and beyond the plane of the outermost face of fourth frame member 14.

Figure 2:
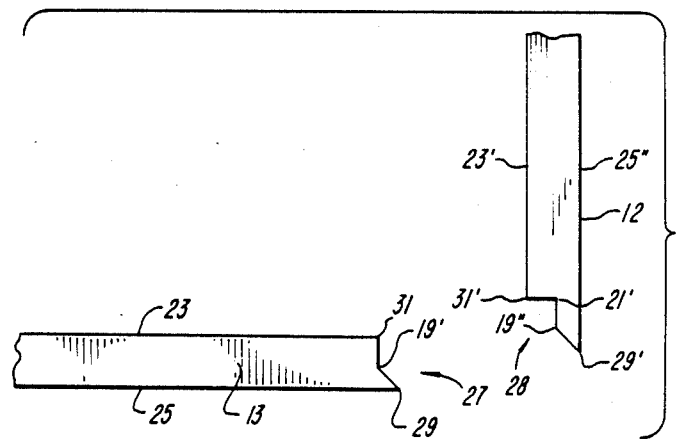
FIG. 2 is an enlarged exploded view of the adjacent ends of two of the mating hollow frame members shown in FIG. 1.

As shown in FIG. 2, a frame member such as third frame member 13 has an inner face 23, an outer face 25 and two ends, one of which is indicated at first end 27. The outer face 25 meets first end 27 at an outer edge 29. The inner face 23 meets the same end at an inner edge 31. First end 27 has a miter cut line extending in a first portion from the outer edge 29 to a first point 19' between the outer edge and the inner edge, ideally not more than halfway between the outer edge 29 and the inner edge 31 and ideally not more than one inch from the outer edge 29. The miter cut line extends in a second portion at an angle from the first portion to the inner edge 31. The angle formed by the junction of the second portion and the inner face 23 at the inner edge 31 is a right angle.

As also shown in FIG. 2, second frame member 12 is constructed to adjoin and mate with first end 27 of the third frame member 13 described above. Second frame member 12 also has an inner face 23', an outer face 25' and two ends. One of the ends, second end 28, adjoins and mates with first end 27. The inner face 23' meets second end 28 at inner edge 31' and the outer face 25' meets the same end at outer edge 29'.

The miter cut line of second frame member 12 extends in a first portion from the outer edge 29' at or about at a 45° angle to a first point 19" ideally less than halfway between the outer edge 29' and the inner edge 31' and ideally not more than one inch from outer edge 29'. The miter cut line then extends in a second portion from the first point 19" to a second point 21' in substantial alignment with the length of second frame member 12. The second point 21' is at a lateral distance from the outer edge 29' that is equivalent to the lateral distance between the outer edge 29 and the inner edge 31 of third frame member 13. The second portion of the miter cut line then continues from the second point 21' to the inner edge 31', meeting the inner face 23' at a right angle. Likewise, the angle created between the first point 19", the second point 21' and the inner edge 31' is a right angle. Second frame member 12 and third frame member 13 are joined to form a square corner. The right angle portion of the miter cut line, also known as a butt cut line, positions the two frame members and aligns the first portion of the miter cut line such that the outside edges 29', 29 of the second and third frame members 12, 13 meet precisely to form a square corner at the apex 17b, as shown in FIG. 1. Misalignment of outside edges and the mating edges of abutting frame members, which can occur with a linear miter cut line, can be eliminated.

The butt cut line also adds strength to the joint. In this regard, it is preferable to make the first portion of the miter cut line substantially shorter than the butt cut second portion. In any event, the first portion is preferably less than one inch in length.

Figure 3:
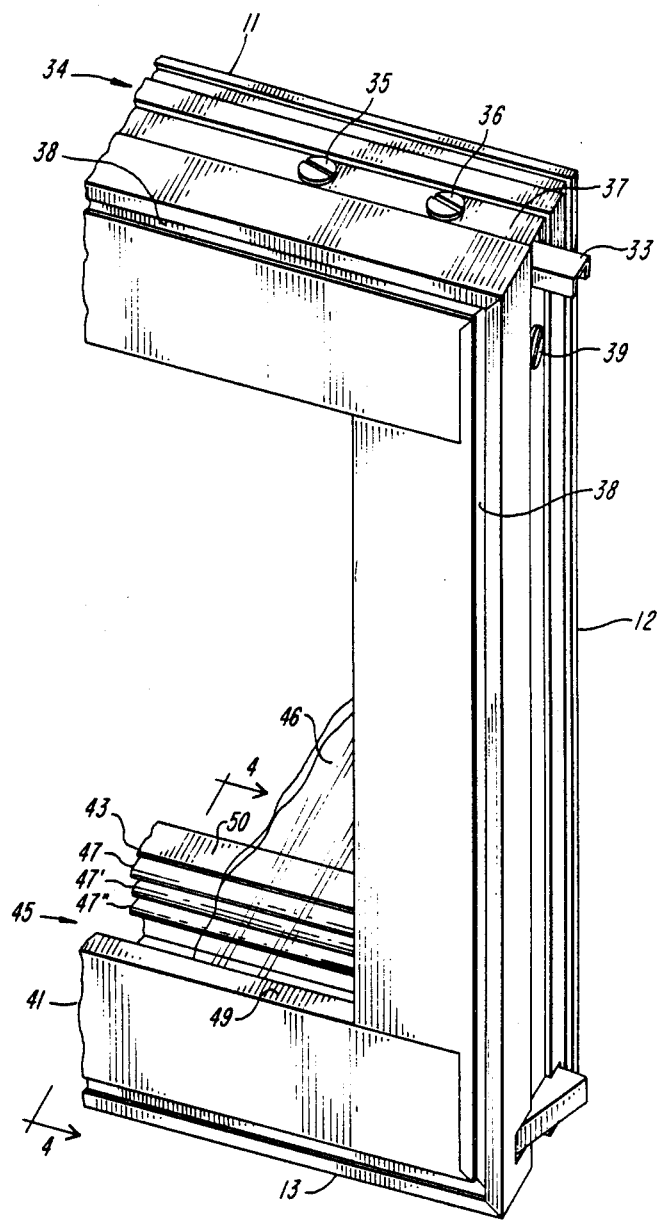
FIG. 3 is an enlarged perspective view of a portion of the window frame assembly shown in FIG. 1.

FIG. 3 illustrates in greater detail the frame assembly 10 of the invention. The first pivot bar 22 is attached within the hollow core of the window frame assembly by screws which pass through the outer face 34 of first frame member 11, first pivot bar screw 35 and second pivot bar screw 36. The pivot bar screws are recessed in a channel 37. A second channel, T-slot 38, runs about the outer margin of a face of the window frame assembly. This T-slot 38 receives weather stripping. While it is preferable that the first portion of the miter cut line be substantially shorter than the second portion, it is also preferable that the first portion extend completely through the T-slot to allow the weather stripping channel of adjacent frame members to meet forming a weatherproof seal. The first frame member 11 and the second frame member 12 are joined at adjacent ends and held together in part by a joint screw 39. This joint will be described in greater detail.

Each of the hollow frame members 11, 12, 13 and 14 are preferably made of identical thermoplastic extrusions and preferably have an inner wall 41, an outer wall 43 and a channel base wall 44 (not shown) which together form on their inside surfaces a window-receiving glazing channel 45. The glazing channel 45 surrounds and supports a window pane 46 along the margin of the window pane. The inner and outer walls 41, 43 of the glazing channel 45 are provided with flexible sealing ribs which extend into the glazing channel 45 to form a moisture and airtight seal between the window frame and the window pane. The flexible sealing ribs of the outer wall 43 are indicated in FIG. 3 at 47, 47' and 47". The inner and outer walls 41, 43 are each provided with a rigid protection rib 49, 50 for protecting the flexible sealing ribs when a window pane is inserted into the glazing channel.

Figure 4:
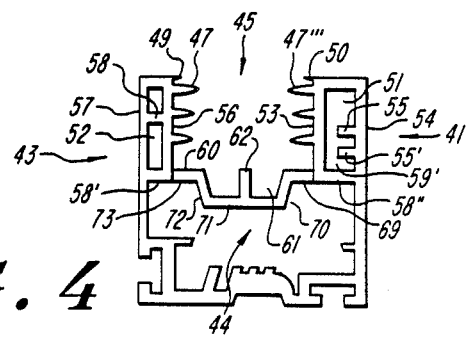
FIG. 4 is a cross section view along line 4—4 of FIG. 3.

The construction of the frame member walls can be better seen in FIG. 4, which is a cross sectional view of FIG. 2 taken along line 4—4.

The inner wall 41 and the outer wall 43 of each hollow frame member are double walled along the glazing channel 45. The double walls have hollow mores 51, 52.

A double wall increases the strength and the insulative capacity of the window frame assembly. The double wall also provides a greater surface area upon which sealant can be spread to strengthen and seal the joints interconnecting adjacent hollow frame members.

Each double wall has a channel facing portion and an outwardly facing portion. The channel facing portion 53 of inner wall 41 supports flexible ribs, one of which is indicated at 47'''. The outside facing portion 54 of inner wall 41 is provided with screw support ribs 55, 55' which define a channel having surfaces for securely receiving screws passing through the outside facing portion 54 of inner wall 41 and into the hollow core 51. Screws may then be used, for example, to securely attach a handle to the hollow frame member.

The channel facing portion 56 of outer wall 43 also supports flexible ribs, one of which is indicated at 47. The outside facing portion 57 of outer wall 43 is interconnected with the channel facing portion 56 of outer wall 43 by a support rib 58. This support rib 58 enhances wall strength and creates air pockets to further enhance the insulative capacity of the window frame assembly.

The channel facing portions 53, 56 of the inner and outer walls 41, 43 are integrally formed with and connected by a channel base wall 44. On the same plane as this connection, channel facing portions 53, 56 are also integrally formed with second and third ribs 58' and 58'', which ribs connect channel facing portions 53, 56, to outside facing portions 54, 57, respectively. These support ribs act to strengthen the inner and outer walls 41, 43 and hold the channel base wall immovably between inner and outer walls 41, 43.

The channel facing walls 53, 56 and the channel base wall 44 define the window receiving glazing channel 45 of the window frame member. The glazing channel 45 of the preferred embodiment is constructed to capture a triple glazed glass unit. The channel base wall 44 of glazing channel 45 is provided with parallel window support seats 59, 60 to support the edge of the two outer panes of glass in a triple glazed unit. A portion of the channel base wall 44 is further recessed from the plane of the window support seats 59, 60 to form a moisture trough 61. The moisture trough 61 collects and channels away moisture collecting from condensation, which moisture could cause failure of the sealant holding the panes of glass together. In the most preferred embodiment, a weep hole 64 (FIG. 5) is provided at the elbows of the window frame assembly joints to allow drainage of moisture from the moisture trough 61. The weep hole 64 is formed in the most preferred embodiment by providing a small space between the ends of adjacent moisture troughs at each elbow.

The moisture trough 61 of the preferred embodiment is also provided with an elongated support rib 62 for supporting a window edge, the middle edge of a triple glazed unit.

Figure 5:
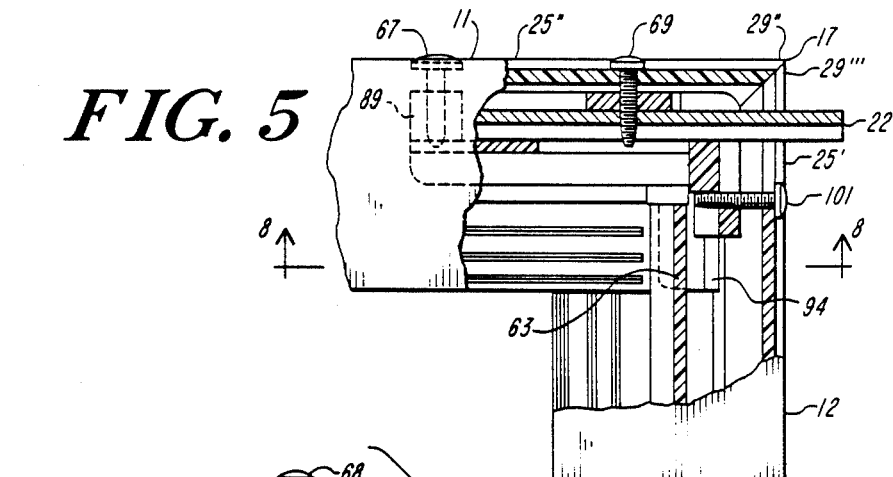
FIG. 5 is an enlarged cut away view of one of the joints of the window frame assembly shown in FIG. 1.
Figure 6:
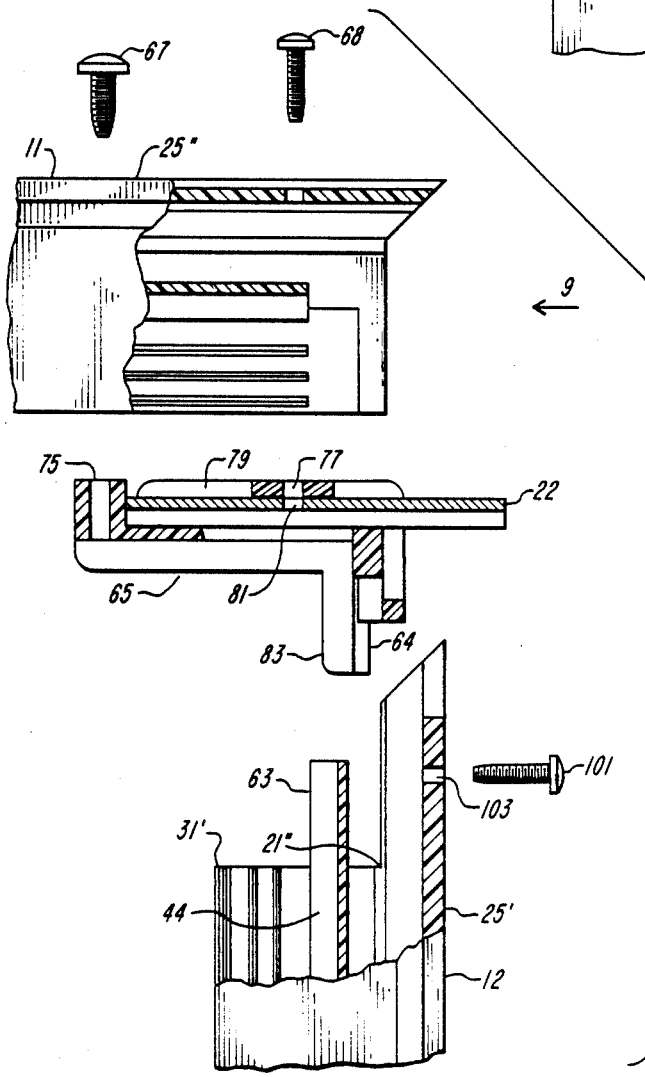
FIG. 6 is an exploded view of the components of the joint shown in FIG. 5.

FIGS. 5 and 6 more particularly illustrate the inteconnection between two adjacent ends of hollow frame members in the preferred embodiment. The first frame members 11 and the second frame member 12 are joined such that their adjacent outside edges 29'', 29''' meet in precise alignment at the apex 17 due to the miter cut line. The right angle second portion of the miter cut line, a butt cut line, positions the two frame members and aligns the first portion of the miter cut line such that the outside edges 29'' and 29''' of the frame members meet precisely to form a square corner. In addition, an anti rack and twist structure acts synergistically with the miter cut line to align and firmly join the frame members.

The anti rack and twist structure is, in the preferred embodiment, a tongue and groove type mating structure. As shown in FIG. 6, the channel base wall 44 of the second frame member 12 extends beyond the plane of the miter cut line between the inner edge 31' and second point 21'' of second frame member 12. Referring back to FIG. 4, the channel base wall has five flat surfaces 69, 70, 71, 72 and 73 on the side facing away from the glazing channel 45. These five surfaces are the surfaces of the tongue 63 that will mate with the groove portion of the anti rack and twist structure.

Figure 7:
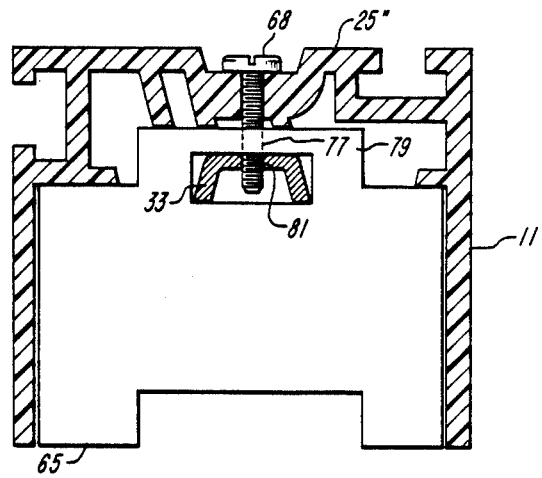
FIG. 7 is a representation of the groove member attached to the hollow frame member as would be seen if looking in the direction of arrow 9 in FIG. 6.

Referring again to FIG. 6, the groove member 65 is an insert which slips into the hollow core of the first frame member 11. Lips 64', 64'' (FIG. 6 and FIG. 8) of the groove member 65 rest on wall surfaces 66, 66' of the channel facing walls 53, 56, which wall surfaces 66, 66' are recessed from the miter cut line 16a'. The groove member 65 is attached to the first frame member 11 by screws 67, 68. The first screw 67 passes through the outer face 25'' of the first hollow member 11 and into a screw-receiving first hole 75 on the groove member 65 to hold the groove member to the first frame member 11. As shown in FIGS. 6 and 7, the second screw 68 passes through the outer face 25 and through a second hole 77 in the spacer portion 79 of the groove member 65 and into a threaded hole 81 in the pivot bar 22. The groove member 65 and the pivot bar 22 are thus held firmly and immovably to the first frame member.

Figure 8:
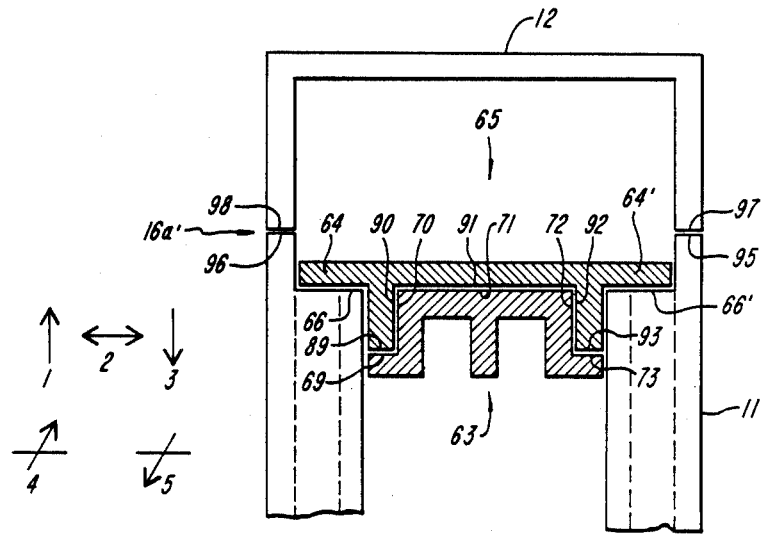
FIG. 8 is a cross sectional view along line 8—8 of FIG. 5.
Figure 9:
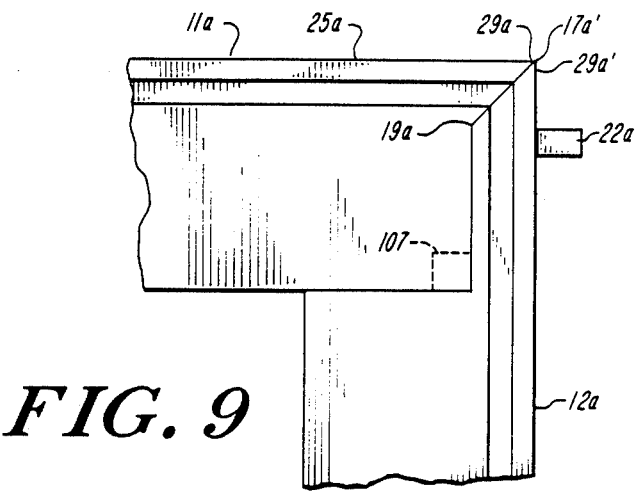
FIG. 9 is an enlarged view of a joint of another embodiment of the window frame assembly according to the invention.
Figure 10:
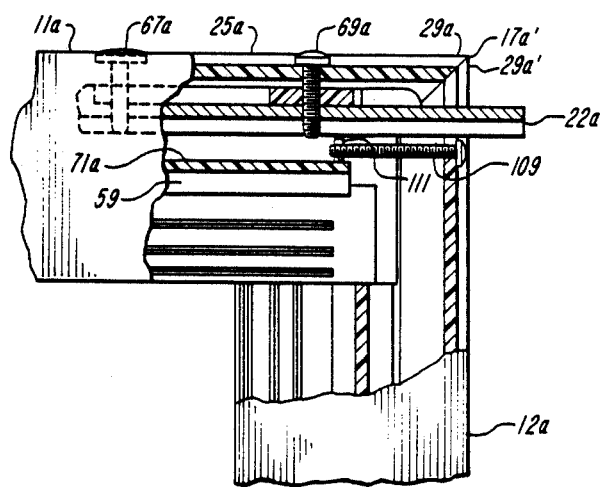
FIG. 10 is a partial cut away view of the joint shown in FIG. 9.

The groove member 65 has a tongue mating portion 83, shown in FIG. 6. This tongue mating portion 83 slidably receives the tongue 63 in a manner that precisely aligns the joint and prevents racking and twisting of the joint. The tongue mating portion 83 has five mating surfaces which mate with the five surfaces 69, 70, 71, 72, 73 of the tongue 63. FIG. 8 shows a cross section of the joint of the preferred embodiment, which cross section illustrates the mating relationship of the five surfaces 69, 70, 71, 72, 73 with the five mating surfaces 89, 90, 91, 92, 93.

Substantially parallel surfaces 69, 71, and 73 mate with mating surfaces 89, 91 and 93, respectively, to prevent the joint from pulling apart in a direction, indicated by arrow 1, parallel to the length of the first frame member 11. Likewise, surfaces 70 and 72 mate with mating surfaces 90 and 92. Together these abutting surfaces prevent any lateral movement, indicated by arrow 2, of the frame members at the joint. All five abutting surfaces act together to prevent racking and twisting of the joint.

Also shown in FIG. 8, miter surfaces 95, 96 of the first frame member 11 mate with miter surfaces 97, 98 of the second frame member 12. These abutting surfaces prevent the frame members from moving closer together in a direction, indicated by arrow 3, that is parallel to the length of the first frame member 11. As can be seen from FIG. 1, the portion of the miter cut line between second point 21 and elbow 18 prevents the frame members from moving closer together in a direction parallel to the length of the second frame member 12. This direction is indicated by arrow 4 in FIG. 8. Finally, the frame members are prevented from pulling apart in a direction, indicated by arrow 5, parallel to the second frame member 12 by joint screw 101, shown in FIGS. 5 and 6. Joint screw 101 passes through a hole 103 (FIG. 6) in the outer face 25' of the second frame member 12 and into the joint screw-receiving hole 105 in the groove member 65. Thus, the groove member, the tongue and the meter cut line act synergistically to precisely align the joint in all directions, to prevent racking and twisting of the joint, and to firmly secure the joint. It is also preferred to apply a sealant to the miter cut line to further strengthen the joint. In this regard, the double walls of the inner and outer wall 41, 43 of the frame members provide an increased surface for applying sealant, which results in a better and stronger seal.

Although the anti rack and twist structure described is the preferred structure, many other structures are possible including, for example, male-female fittings instead of the tongue and groove type structure.

Figure 11:
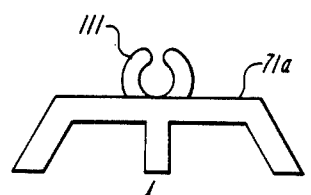
FIG. 11 is a schematic frontal view of the screw boss shown in FIG. 10.
Figure 12:
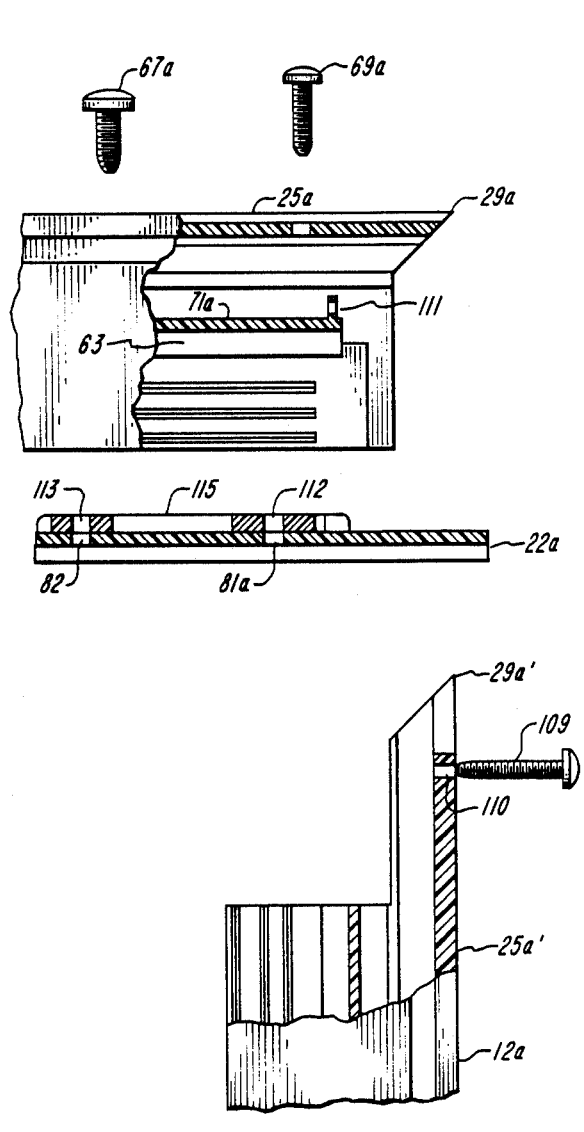
FIG. 12 is an exploded view of the components of the joint shown in FIG. 10.

FIGS. 9, 10, 11 and 12 illustrate another embodiment of the invention. In this embodiment, the joint is held together without the aid of the anti rack and twist means described above. As with the preferred embodiment, a first frame member 11a and a second frame member 12a are joined such that their adjacent outside edges 29a and 29a' meet in precise alignment at the apex 17a' due to the miter cut line. The two frame members are then held firmly in place by joint screw 109 (FIGS. 10 and 11) which passes through a screw hole 110 (FIG. 11) in the outer face 25a' of the second frame member 12a and into a screw-receiving boss 111 positioned on the underside surface 71a of the moisture through 61a. FIG. 11 is a schematic representation of a frontal view of the screw boss 111 on the underside surface 71a of the moisture trough 61a.

As with the preferred embodiment, applying a sealant to the miter cut line further strengthens the joint. Again, the double walls of the inner and outer walls of the frame members provide an increased surface for applying sealant, which results in a better and stronger seal.

The pivot bar 22a is attached to the window frame assembly by pivot bar screws 67a, 69a. The screws 67a, 69a pass through the outer face 25a of a first frame member 11a, through spacer holes 112, 113 and into threaded screw holes 81a, 82 (FIG. 12) in the pivot bar 22a. A flat, rigid, plastic spacer 115 is used to properly place and align the pivot bar 22a in the window frame assembly.

The frame members of the preferred embodiment are made from an extruded plastic such as vinyl material, polyethylene, polypropylene or modified styrene. The wall thickness of each single wall is preferably from 50/1000 to 90/1000 inch. The double walled inner wall is preferably 0.309 plus or minus 5/1000 inch wide and the double walled outer wall is preferably 0.206 plus or minus 5/1000 inch wide. The overall thickness of the frame is preferably 1.465 plus or minus 15/1000 inches. In an embodiment using a triple glazed glass unit, the depth of the glazing channel is preferably 0.625 plus or minus 10/1000 inches and the width of the glazing channel is preferably 0.950 plus or minus 15/1000 inches. The window frame assembly described above may also be used in a glass door as well.

The hollow window frame members may be filled with an insulating or support material. While all the joints of the window frame assembly of the preferred embodiment are of the same construction, only one must be made this way to fall within the scope of this invention.

While walls shown have been substantially flat with an overall rectangular or square cross section to the frame, other shapes can be used if desired. The frame member preferably encloses a glass window although plastic can be used or any other transparent preferably clear material. In some cases, when the joints are used in connection with door frames, the insert held within the window-receiving groove can in fact be an opaque panel. The specific construction of each frame member can vary. Extruded thermoplastic parts are preferred for use and are preferably formed as integral pieces. In some cases, the sealing ribs, such as 47, 47' and 47" can be eliminated and a caulking material used to form the seal. In other cases, if possible, the sealing rib could be coextruded with a single extrusion of each frame member piece such as 12, 13, 14. The rabbeted end portions can be simply cut with a preformed jib as desired. It is an advantage of this invention that the joints can be varied in size with varying dimension frame members as required to form strong non-racking joints with good fit and good outer appearance where the joining edges of adjacent pieces are easily mated to each other in close alignment and without gaps therebetween. While specific locking means such as screws and screw bosses have been defined to lock the corners in place, other means can be used. In some cases where no stresses are applied to door panel portions and the like, simple glueing or sealing can be carried out to rigidify and connect the members. In other cases, additional screw means, locking inserts and the like can be used. While plastics are preferred as the material of the frame members, aluminum and other conventional extrudable materials can be used. In all cases the frame members are extruded parts which are preferably integrally formed during the extrusion process.

It is a feature of this invention that the wall thickness of each extruded frame member is sufficient to provide substantial buttressing effect at the joints particularly in view of the angularly arranged mating surfaces between the parts. These surfaces are formed by members which have wall thicknesses of at least 50/1000 inch to provide sufficient rigidity when plastics are used and preferably have double wall constructions of the type shown in FIG. 4 which enhance the area of adjacent members abutting each other to provide positive interlocking with sufficient butting surfaces to aid in preventing racking and increase stability of each joint.

It should be understood that various changes and modifications of the embodiments shown in the drawings may be made within the scope of this invention. Thus, it is intended that all matter contained in the above description as shown in the accompanying drawings shall be interpreted in an illustrative and not limiting sense.

What I claim is:

1. A hollow frame member for a frame assembly comprising,
an inside facing wall having a first upper edge and a first lower edge,
an outside facing wall having a second upper edge and a second lower edge,
a sash base wall formed integrally with an connecting said inside and outside facing walls along their lower edges,
a channel base wall formed integrally with an connecting said inside and outside facing walls along a line between and parallel to the upper and lower edges of each of said inside and outside facing walls, said channel base wall defining channel forming portions and hollow forming portions of said inside and outside facing walls.

said frame member having two ends, at least one of said ends comprising a rabbeted miter cut extending in a miter cut from said lower edges at about a 45° angle to a first set of points along the hollow forming portions of the inside and outside facing walls, said miter cut extending transversely through said hollow frame member, said rabbeted miter cut then extending in a first butt cut linearly along said hollow forming portion of said inside and outside facing walls parallel to said sash base wall to a second set of points, said first butt cut extending transversely through said hollow frame member, and said rabbeted miter cut extending in a second butt cut perpendicularly from said first butt cut to said upper edges, said second butt cut extending through each of said inside and outside facing walls, and said channel base wall extending beyond said second butt cut to provide a tongue for mating with a groove arrangement in a second frame member.

2. A hollow frame member as claimed in claim 1 further comprising a weather stripping channel extending along said hollow forming portion of said outside facing wall parallel to said lower edge of said outside facing wall and wherein said miter cut extends completely through said weather stripping channel.

3. A hollow frame member as claimed in claim 2 wherein said channel base wall is provided with a central depression extending into the hollow of the hollow frame member, said central depression having at least three surfaces meeting at about right angles.

4. A hollow frame member as claimed in claim 3 wherein said central depression is provided with an elongated rib extending centrally along said central depression for supporting a third pane of a triple pane assembly.

5. A hollow frame member as claimed in claim 4 wherein said inside and outside facing walls are double walled from said channel base wall to said upper edges.

6. A hollow frame member for a window frame assembly comprising, an inside facing wall having a first upper edge and a first lower edge, an outside facing wall having a second upper edge and a second lower edge, a sash base wall formed integrally with and connecting said inside and outside facing walls along their lower edges, a channel base wall formed integrally with and connecting said inside and outside facing walls along a line between and parallel to the upper and lower edges of each of said inside and outside facing walls, said channel base wall defining channel forming portions and hollow forming portions of said inside and outside facing walls.

said frame member having two ends, at least one of said ends comprising a rabbeted miter cut extending in a miter cut from said lower edges at about a 45° angle to a first set of points along the hollow forming portions of the inside and outside facing walls, said miter cut extending transversely through said hollow member, said miter cut then extending transversely through said hollow frame member in a butt cut from said first set of points to the upper edges of said hollow frame member, said butt cut meeting said upper edges at right angles, and said channel base wall ending prior to said butt cut to provide space for receiving an insert into the hollow of the hollow frame member, said insert forming a groove for mating with a tongue arrangement in a second frame member.

7. A hollow frame member as claimed in claim 6 further comprising a weather stripping channel extending along said hollow forming portion of said outside facing wall parallel to said lower edge of said outside facing wall and wherein said miter cut extends completely through said weather stripping channel.

8. A frame member as claimed in claim 7 wherein said channel forming portions of said inside and outside facing walls are double walled, each double wall comprising an inner wall and an outer wall, said inner walls ending short of said outer walls along the butt cut to form a step for supporting said insert.

9. A joint for a window frame assembly having hollow frame members, the ends of two adjacent frame members meeting to form said joint, comprising:

a first hollow frame member comprising a first inside facing wall having a first upper edge and a first lower edge, a first outside facing wall having a second upper edge and a second lower edge, a first sash base wall formed integrally with and connecting said inside and outside facing walls along their lower edges, a first channel base wall formed integrally with and connecting said inside and outside facing walls along a line between and parallel to the upper and lower edges of each of said inside and outside facing walls, said first channel base wall defining channel forming portions and hollow forming portions of said inside and outside facing walls, said frame member having two ends, at least one of said ends comprising a first rabbeted miter cut extending in a first miter cut from said lower edges at about a 45° angle to a first set of points along the hollow forming portions of the inside and outside facing walls, said miter cut extending transversely through said first hollow frame member, said first rabbeted miter cut then extending in a first butt cut linearly along said hollow forming portions of said inside and outside facing walls parallel to said first sash base wall to a second set of points, said first butt cut extending transversely through said first hollow frame member, and said first rabbeted miter cut extending in a second butt cut perpendicularly from said first butt cut to said upper edges, said second butt cut extending through each of said inside and outside facing walls, and said first channel base wall extending beyond said second butt cut to provide a tongue for mating with a groove arrangement in a second hollow frame member, a second hollow frame member comprising a second inside facing wall having a third upper edge and a third lower edge, a second outside facing wall having a fourth upper edge and a fourth lower edge, a second sash base wall formed integrally with and connecting said second inside and second outside facing walls along their lower edges, a second channel base wall formed integrally with and connecting said second inside and second outside facing walls along a line between and parallel to the upper and lower edges of each of said second inside and second outside facing walls, said second channel base wall defining channel forming portions and hollow forming portions of said second inside and second outside facing walls, said second frame member having two ends, at least one of said ends comprising a second rabbeted miter cut extending in a second miter cut from said third and fourth lower edges at about a 45° angle to a third set of points along the hollow forming portions of the second inside and second outside facing walls, said second miter cut extending transversely through said second hollow frame member, said second rabbeted miter cut then extending transversely through said hollow frame member in a third butt cut from said third set of points to said third and fourth upper edges, said third butt cut meeting said third and fourth upper edges at right angles, and said second channel base wall ending prior to said third butt cut to provide a space for receiving an insert into the hollow of the second hollow frame member, said insert forming a groove for mating with said tongue of said first frame member, an insert, said insert having a first leg and a second leg disposed at right angles, said second leg extending into the hollow of said second hollow frame member and said first leg forming a groove arrangement for mating with said tongue of said first hollow frame member, and means for securing said insert to said sash base walls of said first and second frame members.

10. A joint as claimed in claim 9 wherein said channel forming portions of said second inside and second outside facing walls of said second hollow frame member are double walled, each double wall comprising an inner wall and an outer wall, said inner walls ending short of said outer walls along said third butt cut to form a step for supporting said insert, and wherein said first leg of said insert extends in width to overlap said stepped inner wall, but ends prior to said outer wall.

11. A joint as claimed in claim 10 wherein each of said second inside and second outside facing walls is provided with a first rib extending into the hollow of said second hollow frame member, said first ribs restricting the movement of said insert toward said second sash base wall.

12. A joint as claimed in claim 11 wherein each of said channel base walls is provided with a central depression extending into the hollow of the hollow frame member, said central depression having at least three surfaces meeting at about right angles, and, said insert is provided with a pair of second ribs running parallel to the length of and extending perpendicularly from said first leg, said ribs, along with the portion of the first leg disposed therebetween, forming at least three surfaces for mating with said central depression.

13. A joint as claimed in claim 9 wherein each of said frame members is provided with a weather stripping channel extending along said hollow forming portions of said outside facing walls parallel to said lower edges and wherein said miter cuts extend completely through said weather stripping channels.

14. A hollow plastic, supporting frame member for a mounted frame assembly comprising, an inside facing wall having a first upper rigid edge and a first lower rigid edge, an outside facing wall having a second upper rigid edge and a second lower rigid edge, a sash base wall formed integrally with an connecting said inside and outside facing walls along their lower rigid edges, a channel base wall formed integrally with an connecting said inside and outside facing walls along a line between and parallel to the upper and lower rigid edges of each of said inside and outside facing walls, said channel base wall defining upper channel forming portions and hollow forming portions of said inside and outside facing walls, said channel forming portions being double walled, said channel base wall having a central depression extending into the hollow of the hollow frame member, said central depression having at least three surfaces meeting at about right and angles and said central depression having an elongated rib extending centrally along said central depression for supporting a third pane of the pane assembly, a weather stripping channel extending along said hollow forming portion of said outside facing wall parallel to said lower edge of said outside facing wall, said frame member having two ends defining the length of said frame member, at least one of said ends comprising a rabbeted miter cut extending in a miter cut from said lower rigid edges at about a 45° angle completely through said weather stripping channel to a first set of predetermined points along the hollow forming portions of the inside and outside facing walls, said miter cut extending transversely through said hollow frame member from one side of said frame member to an opposite side thereof, said rabbeted miter cut then extending in a first butt cut linearly along said hollow forming portion of said inside and outside facing walls parallel to said sash base wall to a second set of predetermined points, said first butt cut extending transversely through said hollow frame member from one side of said frame member to an opposite side thereof, and said rabbeted miter cut extending in a second butt cut perpendicularly from said first butt cut to said upper edges, said second butt cut extending through each of said inside and outside facing walls, and said channel base wall extending beyond said second butt cut to provide a tongue for mating with a groove arrangement in a second frame member.

* * * * *